United States Patent [19]

Thomas

[11] Patent Number: 5,284,400
[45] Date of Patent: Feb. 8, 1994

[54] GEARSHIFT KNOB ATTACHING ARRANGEMENT

[75] Inventor: Robert M. Thomas, South Lyon, Mich.

[73] Assignee: Chrysler Corporation, Highland Park, Mich.

[21] Appl. No.: 986,416

[22] Filed: Dec. 7, 1992

[51] Int. Cl.$^5$ .......................... G05G 1/06; G05G 9/12
[52] U.S. Cl. .................................. 403/243; 403/361;
74/523; 74/543; 74/553; 74/548
[58] Field of Search .............. 74/553, 523, 543, 473 P,
74/473 R, 548; 403/243, 361

[56] References Cited

U.S. PATENT DOCUMENTS

| | | | |
|---|---|---|---|
| 3,974,711 | 8/1976 | Hurst, Jr. et al. | 74/473 R |
| 4,245,521 | 1/1981 | Osborn | 74/476 |
| 4,541,300 | 9/1985 | Kwiatkowski et al. | 74/476 |
| 4,617,834 | 10/1986 | Foggini | 74/523 |
| 4,693,135 | 9/1987 | LaRocca et al. | 74/473 R |
| 4,708,318 | 11/1987 | Simo | 251/292 |
| 4,791,826 | 12/1988 | Behrens | 74/473 R |
| 4,807,490 | 2/1989 | Foggini | 74/543 |
| 4,896,556 | 1/1990 | Takada | 74/523 |
| 4,991,461 | 12/1991 | Sennett et al. | 74/553 |
| 4,991,535 | 2/1991 | Kobayashi et al. | 74/523 X |
| 5,131,785 | 7/1992 | Shimazaki | 403/326 |

*Primary Examiner*—Randolph A. Reese
*Assistant Examiner*—Christopher J. Novosad
*Attorney, Agent, or Firm*—Edward P. Barthel

[57] ABSTRACT

A fastening arrangement for attaching a handgrip knob assembly to a vehicle gearshift lever rod. The knob has a through cavity comprising an upper cavity portion, an intermediate cavity portion supporting a metal insert, and a lower upwardly tapered cavity portion. The insert upper surface defining a bottom wall clamping surface of the upper cavity portion bottom wall. An internally threaded insert through bore is divided from a lower counterbored portion by an internal stop shoulder. The shift lever rod has an upper threaded stem connected by a cylindrical shank portion to an upwardly tapered rod section while the stem portion terminates in a frustoconical pilot end. A rod external stop shoulder divides the stem and shank sections. A spring steel drive washer, having a central aperture intermeshed with an upper crown portion of a locknut, is initially press-fitted in the upper cavity until its outer edge frictionally engages a serrated portion of the upper cavity. Assembly begins with the installer releasing the knob assembly above the rod stem such that the knob's lead-in cavity slidably receives the rod stem in a gravity induced torque ready manner. Initial torquing of the locknut results in self-threading of the stem through the insert and into the locknut bore causing the stop shoulders to clamp in a first anti-rotational lock. Continued torquing releases the frictionally retained drive washer from the serrated portion thereby clamping the locknut undersurface against the cavity bottom wall providing a second anti-rotational lock.

3 Claims, 4 Drawing Sheets

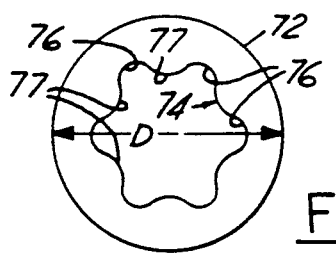
FIG. 1
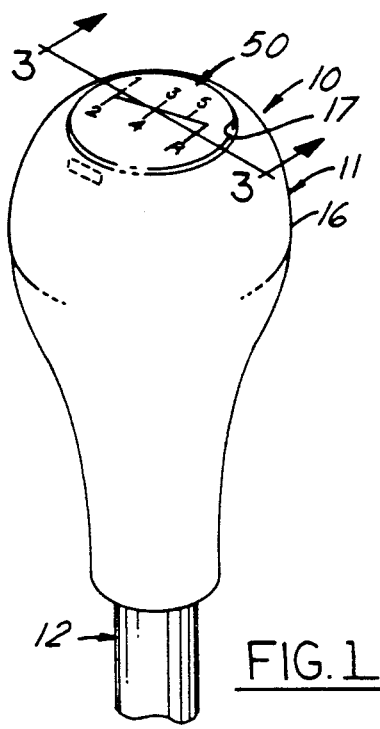
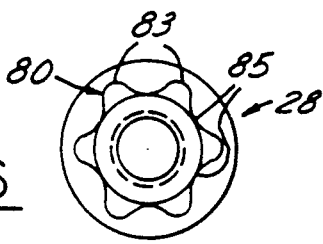
FIG. 15
FIG. 16
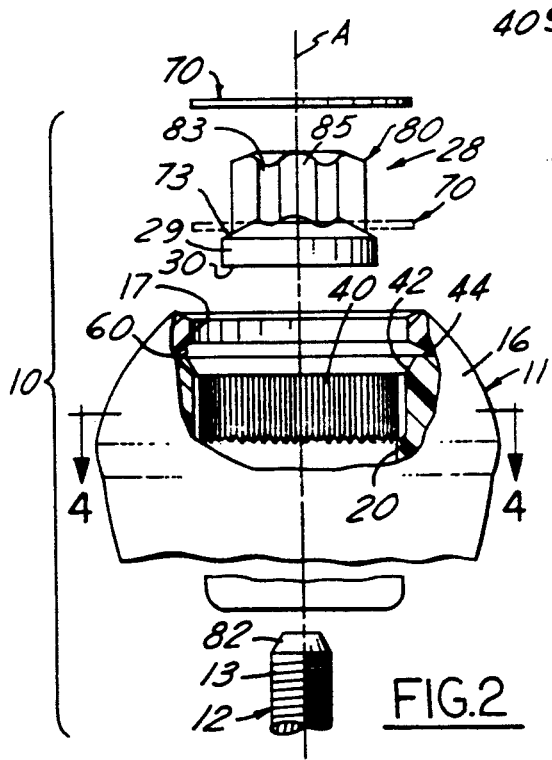
FIG. 2
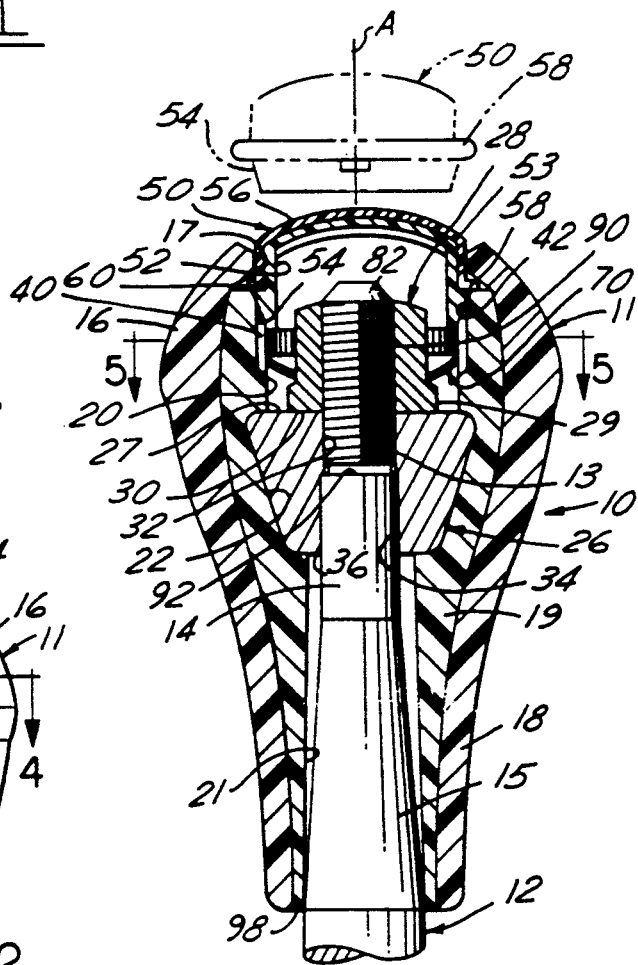
FIG. 3

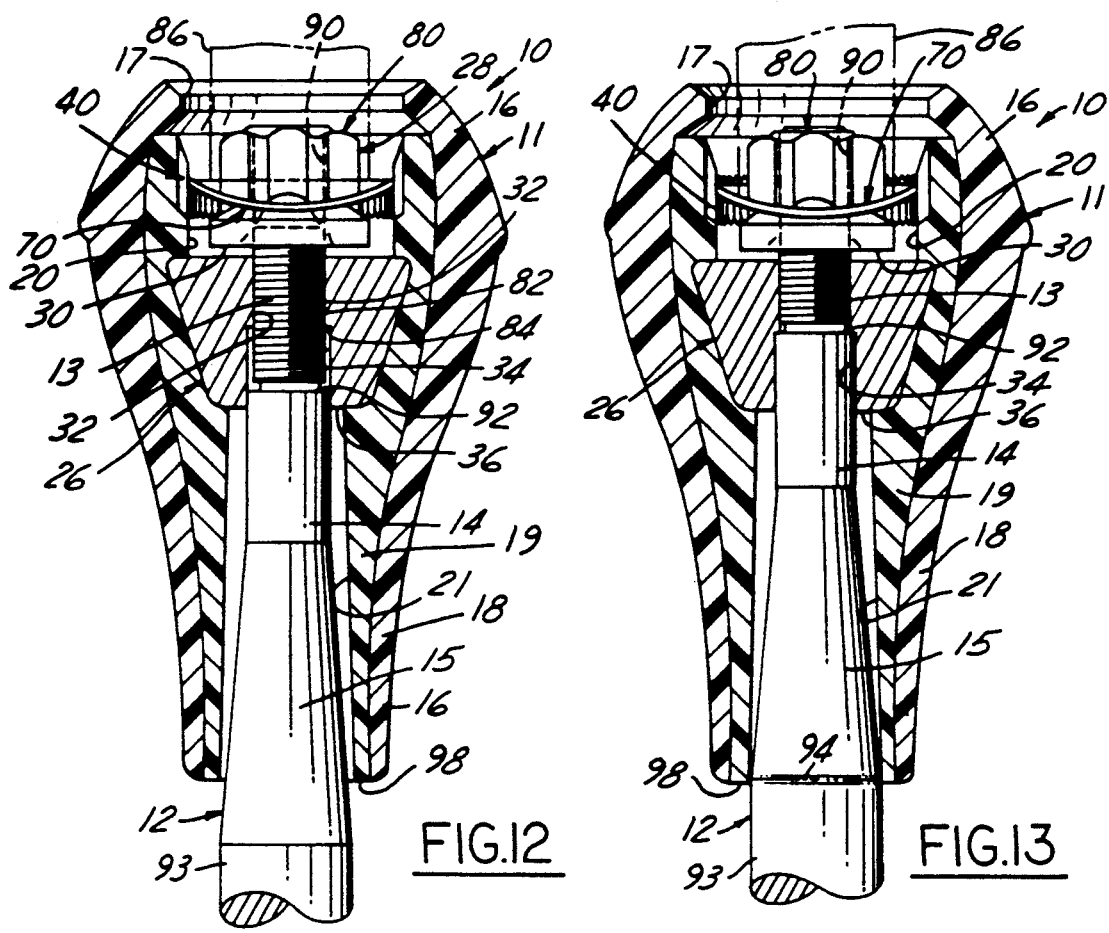
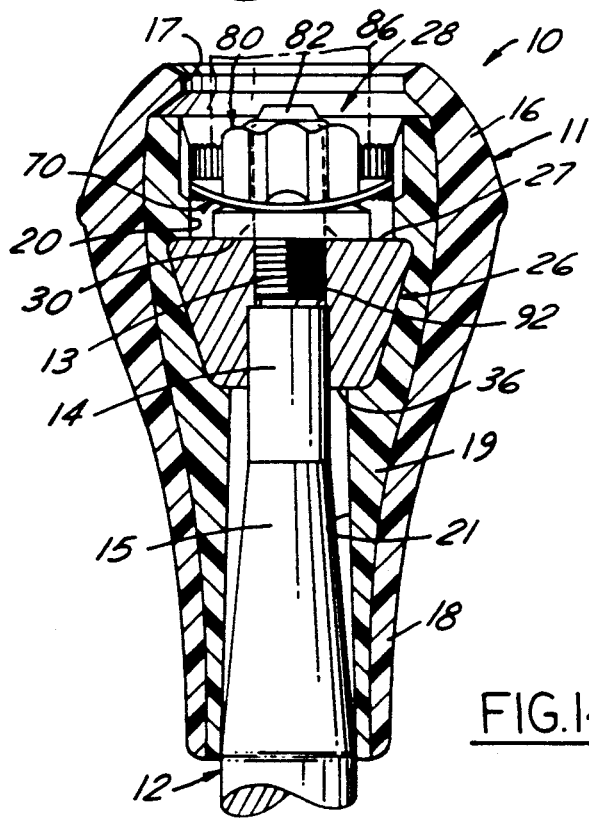
FIG.14
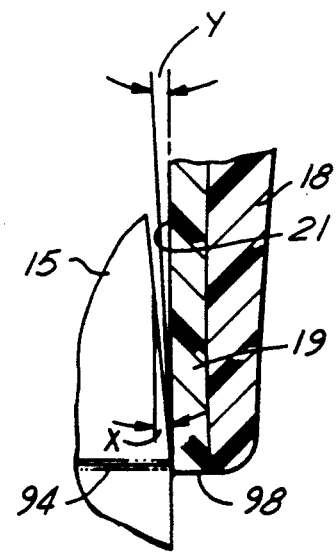
FIG.13A

GEARSHIFT KNOB ATTACHING ARRANGEMENT

BACKGROUND OF THE INVENTION

This invention relates generally to vehicle transmission gearshift levers and more particularly to an improved gearshift lever handgrip knob attaching arrangement.

An example of one form of prior art gearshift knob is shown in U.S. Pat. No. 4,991,461 issued Feb. 12, 1991 to Sennett et al. comprises a cap, a gripping section having an axial bore through it and gear teeth about one end of the bore, and an annular anti-rotation member having an axial bore therethrough and gear teeth about each end of the bore. When assembled, a stem of the cap passes through the axial bores of the gripping section and of the anti-rotation member. The gear teeth of the gripping section mesh with the gear teeth of the anti-rotation member and prevent the member from rotating with respect to the gripping section. A base has an axial bore through it and gear teeth about one end of the bore. The bore has inwardly projecting ribs between which, when the knob is assembled, a spline of the stem of the cap fits at substantially all rotational portions of the spline relative to the base. The gear teeth of the anti-rotation member mesh with the gear teeth of the base and prevent the anti-rotation member from rotating with respect to the base.

The U.S. Pat. No. 4,991,535 issued Feb. 12, 1991 to Kobayashi et al. entitled Shift lever Unit For Automotive Automatic Transmission discloses an arrangement for mounting a control knob on top of a shift lever. The knob has a bore formed therethrough, which bore includes a smaller diameter elongate lower part, a middle diameter intermediate part, and a larger diameter upper part wherein a metal core tightly received in the lower part. The metal core has a longitudinally extending bore which includes a smaller diameter upper part and a larger diameter lower part. The shift lever has a hollow bolt at its upper end while a nut is screwed about the bolt to tightly connect the knob to the shift lever.

SUMMARY OF THE INVENTION

It is an object of the present invention to provide a vehicle transmission shift lever knob attaching arrangement which allows for easy assembly on a vehicle production line with minimal time and labor.

It is still another object of the present invention to provide a shift lever rod handgrip knob attaching arrangement including dual anti-loosening mated couplings comprising a clutch drive washer and lock nut assembledge internal to an upper cavity on the knob top end resulting in ready knob installation and positive retention upon the rod externally threaded stem being threadably engaged initially with an internally threaded knob insert counterbore and thereafter with the lock nut bore.

It is another object of the present invention to provide a shift lever rod and handgrip knob attaching arrangement as set forth above wherein the upper cavity is formed with an internal plastic serrated portion while the drive washer has a central aperture adapted for intermeshed engagement with a crown portion of the lock nut. The drive washer is formed of spring steel with an outer peripheral diameter a predetermined dimension greater than the internal diameter of the cavity serrated portion. When the lock nut and washer assembledge is press-fitted in the serrated portion the washer flexes to form a concave-convex dome urging its outer edge into resilient biting frictional engagement with the serrated portion. The drive washer thus positions the lock nut in an axially spaced pre-installation sub-assembly manner above the knob insert such that the lock nut bore is in coaxial alignment with the insert countersunk bore.

It is still another object of the present invention to provide a shift lever rod and handgrip knob attaching arrangement as set forth above wherein positioning of the knob and lock nut sub-assembly during assembly is a simple operation in that the knob lower end is formed with an upwardly tapered lead-in axial core passage constructed and arranged to initially receive an upper threaded stem portion of the rod upon the installer merely dropping the knob sub-assembly thereon. The rod threaded stem has a chamfered upper end enabling the chamfered end to slide up the core passage and over a step shoulder for providing telescopic guidance of the stem into the insert smooth lower counterbored portion facilitating self-threaded engagement with the insert counterbore. It will be noted that the counterbored portion defines an internal core stop shoulder with the upper threaded counterbore.

It is a still further object of the present invention to provide a shift lever rod and handgrip knob attaching arrangement as set forth above wherein the drive washer functions with the serrated portion to achieve a releasable clutch-like effect establishing an initial torque characteristic of a first magnitude. Upon the rod upper stem portion being threadably engaged with the core counterbore the installer rotates the knob and drive nut assembledge causing the knob, locknut, and drive washer to revolve in unison threading the knob core on the stem. Further torquing by a drive tool causes the stem to threadably engage the locknut bore until an external rod stop shoulder, which divides the threaded stem from the rod, is torqued and clamped to the internal core stop shoulder. At this instant, the first magnitude torque is exceeded causing the drive washer outer edge to overcome its frictional engagement with the knob cavity serrated portion whereupon the locknut is revolved relative to the knob until the locknut undersurface is torqued and clamped to the core upper surface by a second magnitude torque. As a result, the knob assembly is readily secured to the shift lever rod in a dual clamping manner.

A further feature of the present invention is provided by an exterior tapered portion being formed on the shift lever rod in an axially spaced manner from the upper stem portion by an intermediate cylindrical-shaped rod portion. The rod tapered portion is contoured to match a lower sector of the internally tapered core passage located a predetermined axial dimension below the rod stop shoulder. Thus, upon the second magnitude of torque being reached, at the same instant that the locknut undersurface is being clamped to the insert upper surface, the rod tapered surface is drawn into sealed contact with the internally tapered core passage sector.

These and other objects and advantages of the present invention will be readily apparent by reference to the following description of the preferred embodiment and appended drawings.

BRIEF DESCRIPTION OF THE DRAWINGS

FIG. 1 is a fragmentary perspective view of the upper portion of a motor vehicle gear shift lever rod supporting a hand grip knob fabricated in accordance with the present invention;

FIG. 2 is a fragmentary exploded view of the gear shift lever rod and hand grip knob of FIG. 1;

FIG. 3 is a fragmentary vertical cross sectional view of the hand grip knob and lever rod taken on line 3—3 of FIG. 1;

FIG. 12 is a view similar to FIG. 11 showing a fifth stage assembly operation;

FIG. 13 is a view similar to FIG. 12 showing a sixth stage assembly operation;

FIG. 13A is an enlarged fragmentary view of the lower end of the knob juncture with the lever rod;

FIG. 14 is a view similar to FIG. 13 showing a seventh stage assembly operation;

FIG. 15 is an enlarged detail top plan view of the clutch drive washer of the invention; and FIG. 16 is an enlarged detail top plan view of the flange nut of the invention.

DETAILED DESCRIPTION OF THE INVENTION

Figure 4:
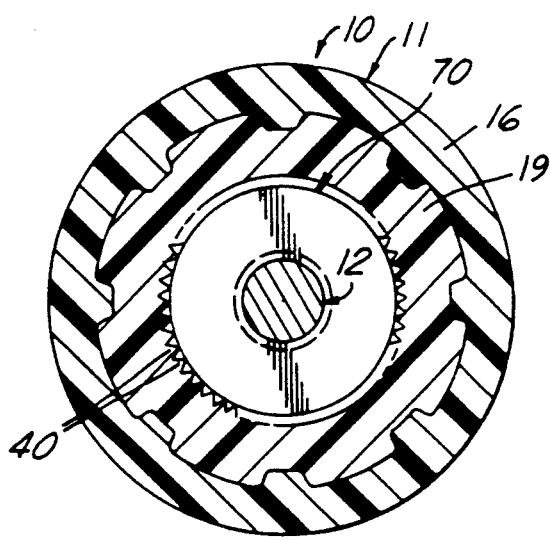
FIG. 4 is a horizontal cross sectional view taken on the line 4—4 of FIG. 2.
Figure 5:
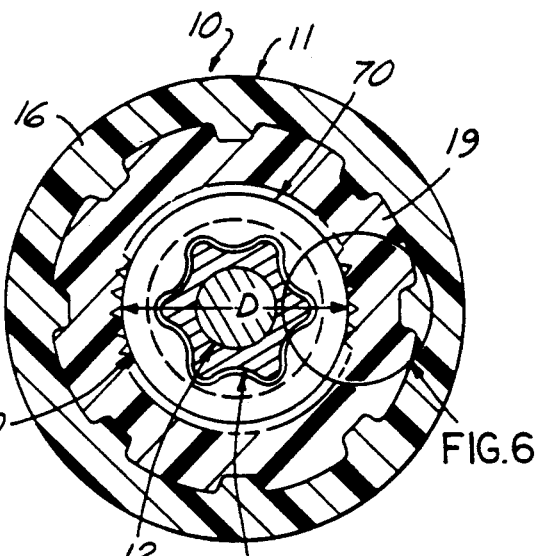
FIG. 5 is a horizontal cross sectional view taken on the line 5—5 of FIG. 3.

Referring now to the drawings in FIG. 1, there is shown a vehicle transmission gearshift operating handgrip knob assembly, generally indicated at 10, affixed to the upper end of a shift lever rod 12. The lever rod has an upper threaded stem portion 13, an intermediate cylindrical portion 14, and a lower frusto-conical portion 15. With reference to FIGS. 2 and 3, the handgrip knob assembly 10 comprises a knob 11 formed with a sheath-like one piece knob outer covering 16 having a bell-like or rounded top, terminating in a circular upper access opening 17, and a downwardly frusto-conically converging shroud formation 18. The outer covering 16 is preferably formed from a relatively soft polymeric material such as soft PVC which is molded over, embedded and counter-shaped to a hard plastic inner core member 19. FIG. 5 shows an inner liner or sleeve member 19 having its outer surface formed with vertically extending uniformly spaced grooves adapted for interlocking molded engagement with conforming raised ridges of the knob outer covering 16.

The sleeve member 19 defines a generally cylindrical-shaped retaining upper cavity portion 20 and an upwardly tapered lead-in lower cavity portion 21 divided by an intermediate inverted frusto-conical shaped socket portion 22 having embedded therein a frusto-conical shaped downwardly converging core insert member generally indicated at 26. The core insert member 26, which is preferably formed as a screw machine part from steel stock, has an upper surface 27 defining the upper cavity bottom wall adapted to seat, in a clamping manner, a locknut mating undersurface 30 thereon. The core insert member upper surface 27 is adapted to bear against and lockingly seat thereon a flanged locknut 28. The locknut is provided with a crown portion, shown scalloped or ribbed in FIG. 16, for a comfortable finger grip.

FIG. 2 depicts the locknut 28 formed with a radial flange 29 at its lower end defining a planar undersurface 30 adapted for flush clamping engagement with opposed upper cavity bottom wall. In the preferred embodiment the cavity bottom wall is defined by the insert upper surface 27. It will be noted in FIG. 3 that the core insert member 26 is machined with an axial through bore, generally indicated at 32, disposed concentrically about principal axis "A". The insert member bore 32 is internally threaded and extends longitudinally downwardly from the insert upper surface 27. The insert bore terminates in a radially enlarged cylindrically smooth counterbore portion 34 having its entrance in the insert member lower end providing a stop face 36. The knob assembly 10 thus has an axial passage extending therethrough which comprises access opening 17, upper cavity portion 20, intermediate or interconnecting insert through bore 32 (including its counterbore portion 34), and the downwardly and outwardly tapered lower lead-in cavity 21.

Figure 6:
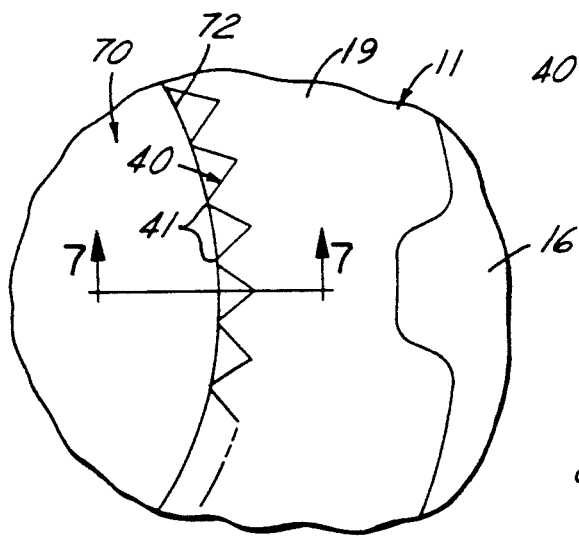
FIG. 6 is an enlarged cross sectional view of a portion of FIG. 5 taken within the circle denoted "FIG. 6"

As best seen in FIGS. 2 and 6, the knob upper cavity portion 20 has its upper entrance defined by an interior serrated portion generally indicated at 40. The serrated portion 40 comprises a plurality of angularly spaced axially extending V-shaped saw tooth-like teeth 41 projecting radially inwardly and concentrically disposed about the principal axis "A" of the knob upper cavity portion 20. It will be observed that the serrated portion 40 terminates at its upper end in a smooth cone-shaped internal beveled portion 42 that tapers radially outwardly and upwardly to upper end face 44 of the liner member 19.

The upper cavity portion 20 is adapted to be closed-off by a suitable snap-in cap member such as the cap member shown at 50 in FIG. 3. FIG. 3 shows the cap member 50 having an inner cylindrical body portion 52 and an upper closed end 53, formed of suitable hard plastic material. The cap member body portion 52 terminates in an exterior conical portion 54 that tapers downwardly and radially outwardly such that it is adapted to mate with the core internal beveled portion 42. The cap member 50 is shown molded with an outer plastic covering 56 formed with a radially outwardly projecting resilient locking lip 58. As seen in FIG. 3, the lip 58 is adapted for snap-action capture in an undercut notch 60 defined by an upper peripheral resilient border portion of the knob outer covering 16.

Figure 7:
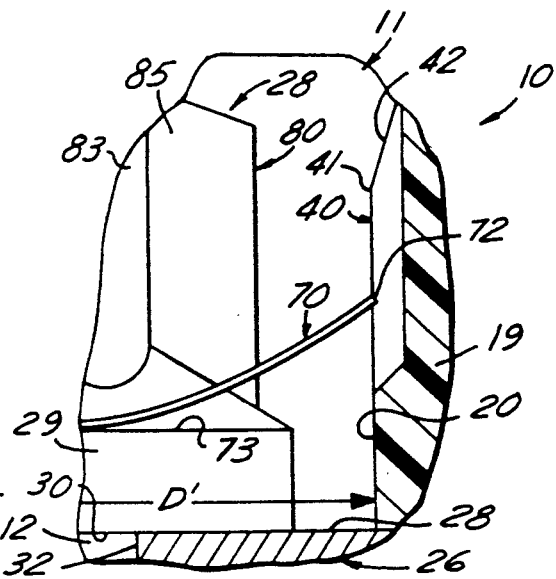
FIG. 7 is a fragmentary vertical sectional view taken on the line 7—7 of FIG. 6.

With reference to FIG. 15, an annular clutch drive washer 70 is provided is preferably formed of thin flexible sheet metal material, such as spring steel, which is essentially flat in its relaxed condition (FIG. 2). The clutch drive washer 70 has an outer circular edge 72 of diameter "D" (FIG. 15) which is a predetermined dimension greater than internal diameter "D'" (FIGS. 7 and 10) of the upper cavity 20. Thus, to fit within the upper cavity portion 20, the drive washer outer edge 72 must be flexed downwardly against the internal serrated portion 40. This results in the central portion of the drive washer being bowed or flexed convexly downwardly as best seen in FIG. 7.

With respect to FIG. 15, the clutch drive washer 70 central aperture is in the form of an internal gear, generally indicated at 74, having a plurality of radially outwardly extending and circumferentially spaced lobe-shaped grooves 76 separated by internal radially inwardly extending lobe-shaped teeth 77. As seen in FIG. 15, the drive washer central aperture internal teeth 77 provide an intermeshed slip fit connection with upper crown portion 80 of the locknut 28. As seen in FIG. 16, the hex crown portion 80 is externally ribbed to define a plurality of radially outwardly extending uniformly spaced external lobe-shaped ribs 83 separated by lobe-shaped sockets 85. The external ribs 83 and sockets 85 are complementary arranged so as to slidably intermesh and receive respective drive washer internal grooves 76 and teeth 77 thereby keying the drive washer 70 thereon as an assembledge against relative rotation therebetween. The washer central internally geared aperture 74 and locknut externally ribbed crown portion intermesh in a relatively loose manner thereby compensating for slight tolerance mis-alignment of the locknut bore and the insert central threaded bore 32.

The drive washer 70 and locknut 28 are first intermeshed as an assembledge, as seen in FIG. 2, showing the intermeshed drive washer in phantom lines permitting axial travel of the drive washer on the locknut crown portion 80. It will be seen in FIG. 8 that, with the locknut and washer assemblage inserted in the knob upper cavity portion 20, the steel drive washer outer edge 72 establishes an interference press-fit with the plastic serrated portion 40. This occurs because the outer diameter of the washer is substantially smaller than the internal diameter "D" of the upper cavity 20. As a consequence, the drive washer flexes convexly downward causing its outer edge 72 to bite into the plastic serrated teeth 41 (FIG. 6) providing a first predetermined initial tight frictional engagement therewith upon a first magnitude of driving torque being applied to the locknut.

The knob 11 is thus initially secured against free rotation relative to the locknut 28 in response to an initial driving torque applied to its crown portion 80 characteristic of such first magnitude. Upon the locknut undersurface 30 establishing a predetermined second magnitude of torque locking engagement with the insert upper surface 27, the drive washer acts as a clutch member. That is, the drive washer permits the locknut and washer assembledge to be rotated relative to the knob 10 whereby its undersurface 30 is torqued down on the insert upper surface 27 providing a second or final magnitude of driving torque achieving dual locking surfaces. Thus, the locknut 28 and drive washer 70 provide a sub-assembly or assembledge that is in initial retention by virtue of the drive washer annular edge 72 fictionally engaging the cavity serrated portion 40 in an interference fit.

Figure 8:
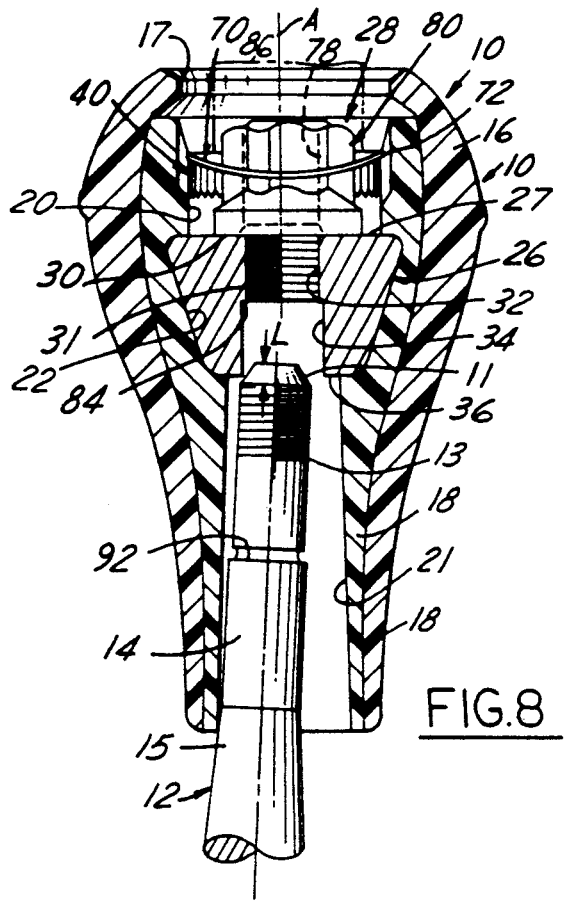
FIG. 8 is a fragmentary vertical sectional view of a hand grip knob dropped on a lever rod upper end in a first stage assembly operation.

FIG. 8 shows the drive washer 70 press-fitted by a suitable tool, not shown, into a downwardly convex or domed shape wherein the locknut 28 is initially retained against rotation held in its pre-assembled relation with its undersurface positioned by gravity on the insert upper surface 27. It will be noted in the sub-assembly of FIG. 8 that the locknut 28 has its central internally threaded through bore 90 aligned on the knob upper cavity portion principal vertical axis "A" and thus vertically aligned with the insert threaded bore 32.

As seen in the first stage assembly operation of FIG. 8, a feature of the invention enables the pre-assembled knob assembly 10 to be readily located on the upper stem 13 of the lever rod 12. An installer merely aligns and releases the knob assembly in a vertically spaced manner above the rod stem. As a result the lead-in cavity 21 slidably receives the stem providing an initial self-threading gravity induced "drop-on" connection for ready vehicle assembly line installation. Thus, chamfered pilot end 82 formed on the upper end of stem 13 is adapted to be initially slidably received in the knob lead-in tapered core passage 21 in a non-aligned manner, as seen in FIG. 8. It will be noted in FIGS. 8 and 10 that the pilot end 82 defines a predetermined tapered axial dimension "L" assuring that the pilot end 82 overrides internal insert step face 36 for subsequent self-aligned coaxial positioning of rod axis "A-1" with knob axis "A".

As shown in FIG. 8, the possibility of a hang-up between the rod 12 and the step face 36 is obviated by the chamfered pilot end 82. Applicant's arrangement thus enables the installer to initially readily drop the knob assembly on the lever rod 12 without having to spend time exactly aligning the tapered core passage 21 with the stem. Thereafter, gravity acts of the knob assembly achieving lead-in guidance of threaded stem 13 into insert counterbore 34 resulting in self-aligned self-threaded engagement of the stem in insert axial bore 32. A horizontally disposed flat circular internal stop shoulder 84 is shown dividing the upper threaded axial bore 32 and its lower smooth counterbored portion 34. It will be noted in FIG. 10 that the predetermined major diameter of the threaded stem 13 is only slightly less than predetermined internal diameter "D1" of the counterbore portion 34. Thus, applicant's invention achieves self-threading engagement of the stem in the axial bore portion 32 as explained below.

Figure 9:
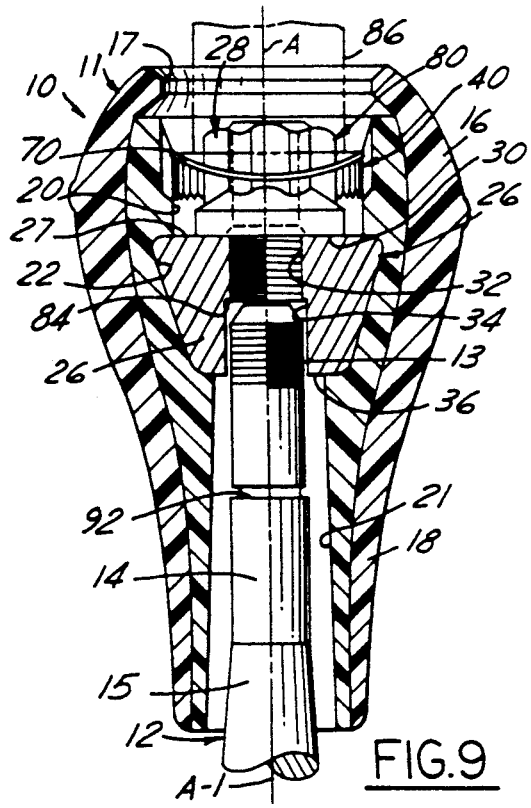
FIG. 9 is a view similar to FIG. 8 showing a second stage assembly operation.

A second stage assembly operation is shown in FIG. 9 wherein the rod stem 13 is received in the smooth-walled counterbore 34. The counterbore 34, having a predetermined internal diameter relative to the major thread diameter of the rod stem 82, results in the rod stem 13 being telescopically received in the smooth counterbore 34. As a result, the rod axis "A-1" is self-aligned with the axis "A" of the insert threaded axial bore 32.

Figure 10:
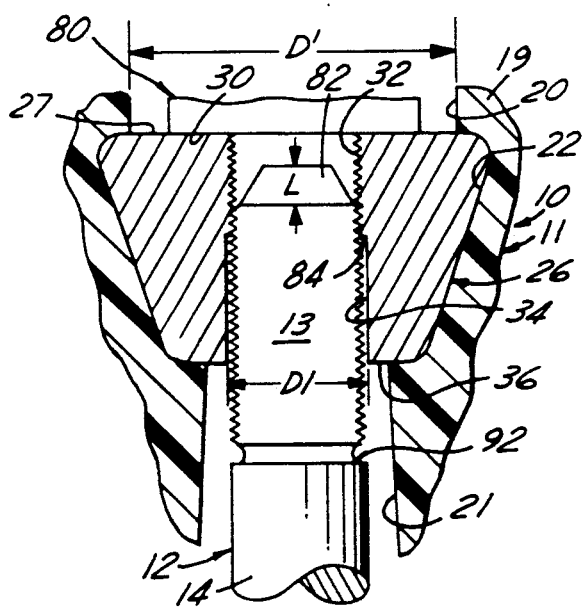
FIG. 10 is an enlarged vertical sectional view of a portion of FIG. 9 showing a third stage assembly operation.

A third stage of the assembly operation is shown in FIG. 10 wherein the installer initially inserts the socket of a driving tool 86 over the locknut crown 80 and spins the knob 11 clockwise. As the locknut 28 is initially held in positive fixed relation in the knob upper cavity portion 20 by the drive washer 70, spinning of the knob 11 will cause conjoint rotation of the locknut 28 thereby partially threading the lever rod stem 13 into the insert threaded bore 32.

Figure 11:
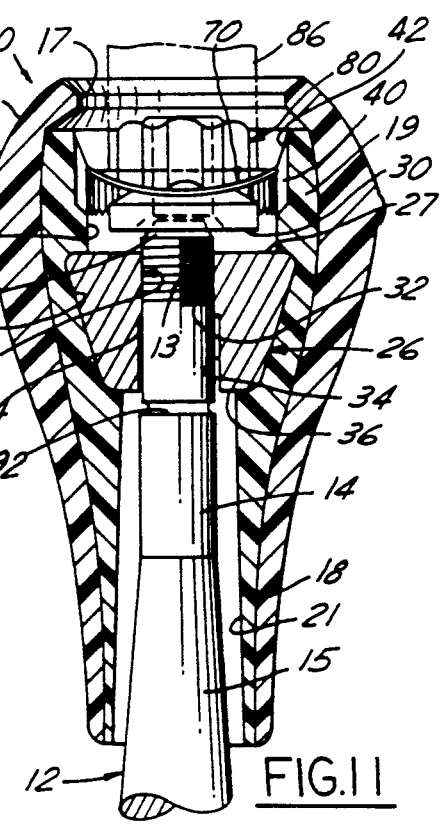
FIG. 11 is a view similar to FIG. 9 showing a fourth stage assembly operation.

A fourth stage of the assembly operation is shown in FIG. 11 wherein the installer continues driving the tool 86 and torques the locknut clockwise threading the insert member 26 downwardly on the rod stem 13 knob until the chamfered pilot end 82 protrudes upwardly into locknut lower smooth counterbore 34.

The fifth stage is shown in FIG. 12 wherein continued conjoint torquing of the knob 11 and locknut 28 by the driving tool 86 causes the knob 10 to threadably move axially downwardly on the lever rod 12 thereby causing the insert counterbore portion 34 to receive therein rod stop shoulder 92 therein. It will be noted that the driving tool 86 applies a first magnitude of torque causing the knob 11 to continue rotating in unison with the locknut 28.

The sixth stage of the assembly operation is shown in FIG. 13 wherein the rod stop shoulder 92 is brought into flush clamping engagement with the core countersunk bore internal stop shoulder 84. At this instant, the first magnitude of torque is exceeded causing the clutch drive washer 70 to cut-away or deform the serrated portion and continue spinning relative to the knob serrated portion 40. Said differently, such drive washer rotation causes its outer edge 72 to cut-away the serrated portion teeth 41 allowing the locknut 28 to continue being threading driven downwardly on stem 82. The lever rod external stop shoulder 92 thus provides a first anti-rotation lock or "jam nut" effect with the core member internal stop shoulder 84.

With reference to FIG. 13A there is shown an enlarged view of the juncture between the knob lower end 98 and lever rod juncture 94. Upon seating the rod external stop shoulder 92 with the insert internal stop shoulder 84, which occurs between the fifth stage (FIG. 12) and the sixth stage (FIG. 13), the rod external conical tapered portion 15 is drawn into an interference "line contact" fit with the knob shroud core internal conical tapered portion 21. It will be noted in FIG. 13A that rod external tapered portion 15 has a first predetermined pitch angle "X" while the core internal tapered portion 21 has a second predetermined lesser pitch angle "Y", both angles being with respect to a vertical axis. It will be further noted that the transition between the rod tapered portion 15 and its cylindrical portion 93 is defined by the juncture 94 which is rounded at a predetermined radius.

Thus, as the rod external stop shoulder 92 approaches the knob plastic insert internal stop shoulder 84 the lower end of internal tapered core portion 21 is drawn into a single-line contact with the rod radiused juncture 94. The resulting constant frictional interference fit between the metal rod and the plastic knob core adjacent its lower end 98 causes the core 19 to cold-flow around the radiused juncture 94 over a predetermined time interval, thereby achieving a stress relieved connection with the rod juncture.

A seventh and final stage is shown in FIG. 14 wherein the locknut undersurface 30 is torqued down on the upper surface 27 of the insert by a second magnitude of torque thereby creating a second anti-rotation lock or jam nut effect therebetween.

With reference to FIGS. 1 and 3, it will be seen that the cap member 50 is adapted for snap-action insertion of its retaining lip 58 in undercut notch 60 subjacent the upper circular access opening 17 formed in the knob outer resilient plastic covering 14. By virtue of this design, the hand grip knob assembly is adapted for common installation on each gear shift lever rod 12 with only the cap member 50 requiring a different part number depending upon the particular shift pattern 92 imprinted thereon.

It will be appreciated that the above-identified construction has been set forth solely by way of example and illustration of the principles of the present invention and that various other modifications and alterations may be made therein without departing from the spirit and scope of the invention.

What is claimed is:

1. In a fastening arrangement for attaching a handgrip assembly to a gearshift lever rod comprising:

a handgrip knob having an axially extending through passage concentrically disposed about a vertical knob axis of symmetry, said through passage comprising an upper cylindrical cavity portion, an intermediate cavity portion, and a lower lead-in cavity portion;

an insert fixedly received in said intermediate cavity portion separating said upper and lower cavity portions, said insert having an upper end establishing a transverse bottom wall of said upper cavity portion, said insert having an internally threaded through bore terminating at its lower end in a smooth counterbore portion aligned on said knob axis and divided by an internal flat circular insert stop shoulder;

a shift lever rod having a cylindrical shank section terminating at its upper end in a threaded stem section formed with a frusto-conical pilot section on the upper end thereof, an external rod stop shoulder dividing said shank section from said stem section, said rod stop shoulder being flat and circular and having a diameter substantially equal to the diameter of said insert stop shoulder;

said upper cavity portion formed with a plastic serrated portion concentrically disposed about said knob axis, said serrated portion having an interior diameter of a predetermined dimension; a flexible metal drive washer having a circular peripheral edge and a central aperture formed with internal rib means;

said interior diameter of said serrated portion being less than the diameter of said flexible metal drive washer in its substantially planar relaxed state;

a locknut formed with an upper crown portion and a radial flange at its lower end, said locknut having an internally threaded central bore and a planar undersurface, said locknut crown portion having axially extending external rib means slidably intermeshed with said drive washer central aperture internal rib means forming a splined assemblage;

whereby upon said assemblage being inserted in said knob upper cavity said drive washer outer peripheral edge engages said plastic serrated portion such that said washer flexes convexly downwardly urging its peripheral edge into resilient biting engagement with said plastic serrated portion establishing a frictional press-fit connection therewith, whereby said locknut is captured in said upper cavity allowing limited axial movement whereby said locknut planer undersurface is positioned by gravity on said upper cavity bottom wall;

whereby upon said knob lower cavity portion receiving said rod pilot section said knob lower cavity slides thereon causing said stem section to be telescoped into said insert counterbore facilitating threaded engagement of said stem with said insert axial bore, such that upon rotation of said knob said insert being threaded downwardly wherein said pilot section is axially advanced above said upper cavity bottom wall and threadably engage said locknut bore, providing an initial drive torque of first magnitude; and whereby continued rotation of said knob causes said rod external stop shoulder to clamp and create a first anti-rotation lock against said insert internal stop shoulder, such that continued rotation of said locknut causes said drive washer peripheral edge to overcome said frictional connection with said serrated portion to provide a final prevailing drive torque of second magnitude, causing said locknut undersurface to clamp and create a second anti-rotational lock against said upper cavity bottom wall.

2. The fastening arrangement as set forth in claim 1 wherein said serrated portion comprising a plurality of angularly spaced axially extending V-sectioned saw tooth-like teeth projecting radially inwardly and concentrically disposed about the principal axis of said knob upper cavity portion.

3. The fastening arrangement as set forth in claim 1 wherein said knob lower lead-in cavity portion is conical shaped and formed of elastomeric material having a first predetermined internal pitch angle to the vertical and said lever rod having a conical portion intermediate said cylindrical shank section and a cylindrical-shaped rod portion such that said conical portion and said rod portion define a predetermined radiused juncture therebetween, said rod conical portion having a second predetermined external pitch angle to the vertical that is less than said first internal pitch angle, whereby upon the rod external stop shoulder seating on the insert internal stop shoulder the lower end of the core internal tapered portion is drawn into single-line contact with said radiused juncture whereby a stress relieved connection is achieved therebetween resulting in cold-flow of said core about said radiused juncture.

* * * * *